(12) United States Patent
Arao (10) Patent No.: US 11,934,005 B2
(45) Date of Patent: Mar. 19, 2024

(54) METHOD OF MANUFACTURING OPTICAL CONNECTOR

(71) Applicant: SUMITOMO ELECTRIC INDUSTRIES, LTD., Osaka (JP)

(72) Inventor: Yuki Arao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 267 days.

(21) Appl. No.: 17/332,026

(22) Filed: May 27, 2021

(65) Prior Publication Data

US 2021/0286125 A1    Sep. 16, 2021

Related U.S. Application Data

(63) Continuation of application No. PCT/JP2020/001070, filed on Jan. 15, 2020.

(30) Foreign Application Priority Data

Jan. 17, 2019  (JP) ................. 2019-005692

(51) Int. Cl.

| G03B 37/02 | (2021.01) |
|---|---|
| C03B 37/027 | (2006.01) |
| G02B 6/02 | (2006.01) |
| G02B 6/24 | (2006.01) |
| G02B 6/26 | (2006.01) |
| G02B 6/38 | (2006.01) |

(52) U.S. Cl.
CPC ........ G02B 6/02042 (2013.01); C03B 37/027 (2013.01); G02B 6/02309 (2013.01); G02B 6/262 (2013.01); G02B 6/3885 (2013.01)

(58) Field of Classification Search
CPC ........ G02B 37/027; G02B 6/02; G02B 6/262; G02B 6/38
USPC .......................................... 385/24
See application file for complete search history.

(56) References Cited

U.S. PATENT DOCUMENTS

| 6,075,596 A * | 6/2000 | Pan ................. G02F 1/093 |
|---|---|---|
| | | 356/450 |
| 6,310,717 B1 * | 10/2001 | Naganuma ........... H01S 3/067 |
| | | 359/341.1 |

(Continued)

FOREIGN PATENT DOCUMENTS

| JP | H10274728 A * | 5/2012 |
|---|---|---|
| JP | 2013-238692 A | 11/2013 |

(Continued)

*Primary Examiner* — Kaveh C Kianni
(74) *Attorney, Agent, or Firm* — Oliff PLC (57) ABSTRACT

There is provided a method of manufacturing an optical connector, including: preparing a multi-core optical fiber including a glass fiber and a resin coating that covers the glass fiber; inserting the glass fiber exposed from the resin coating into the ferrule such that the glass fiber protrudes from an end surface of a ferrule by a length A; rotating and aligning the multi-core optical fiber with respect to the ferrule; fixing the multi-core optical fiber to the ferrule; and so as to scrap off a tip end of the ferrule by a length. A deviation angle in the circumferential direction between a first initial end surface of the one end of the prepared glass fiber and a cross section of the glass fiber separated from the initial end surface by a length A+B mm is equal to or less than 0.9°.

6 Claims, 7 Drawing Sheets

(56) References Cited

U.S. PATENT DOCUMENTS

| | | | |
|---|---|---|---|
| 7,228,013 B1* | 6/2007 | Bramson | G02B 6/126 385/40 |
| 2002/0081067 A1* | 6/2002 | Brun | G02B 6/3834 385/74 |
| 2005/0238292 A1* | 10/2005 | Barnes | G02B 6/3846 385/78 |
| 2006/0245695 A1* | 11/2006 | Fujiwara | G02B 6/3885 385/71 |
| 2009/0016683 A1* | 1/2009 | Zheng | G02B 6/3822 385/78 |
| 2013/0299076 A1* | 11/2013 | Bradley | G02B 6/02042 156/434 |
| 2014/0219609 A1 | 8/2014 | Nielson et al. | |
| 2016/0252683 A1 | 9/2016 | Sasaki et al. | |
| 2016/0266328 A1 | 9/2016 | Bradley et al. | |
| 2019/0170931 A1 | 6/2019 | Sakamoto et al. | |

FOREIGN PATENT DOCUMENTS

| | | |
|---|---|---|
| JP | 2014-052490 A | 3/2014 |
| JP | 2014-133673 A | 7/2014 |
| JP | 2016-175800 A | 10/2016 |
| JP | WO2018/008399 A1 | 11/2018 |
| WO | 2013/027586 A1 | 2/2013 |
| WO | 2015/098863 A1 | 7/2015 |

\* cited by examiner

METHOD OF MANUFACTURING OPTICAL CONNECTOR

CROSS REFERENCE TO RELATED APPLICATION

This application is a continuation of International Application NO. PCT/JP2020/001070, filed on Jan. 15, 2020, which claims the priority of Japanese Patent Application No, 2019-5692, filed on Jan. 17, 2019, the entirety of which is incorporated herein by reference.

TECHNICAL FIELD

The present disclosure relates to a method of manufacturing an optical connector.

BACKGROUND

JP2013-238692A discloses a method of manufacturing an optical connector for manufacturing a connector for multi-core optical fibers, the method includes: a step of placing the optical fiber on a ferrule; a step of monitoring the optical fiber from an end surface of the optical fiber and rotating and aligning the optical fiber; and a step of polishing the end surface of the optical fiber.

SUMMARY

According to one aspect of the present disclosure, there is provided a method of manufacturing an optical connector, including: preparing a multi-core optical fiber including a glass fiber and a resin coating that covers the glass fiber; inserting into the ferrule the glass fiber exposed from the resin coating at one end of the multi-core optical fiber such that the glass fiber protrudes from an end surface of the ferrule by a length of A mm; rotating and aligning the multi-core optical fiber with respect to the ferrule; fixing the multi-core optical fiber to the ferrule; and polishing one end of the protruding glass fiber and the end surface of the ferrule so as to scrap off a tip end of the ferrule by a length B mm. A deviation angle in the circumferential direction between an end surface (first initial end surface) of the one end of the prepared glass fiber and a cross section of the glass fiber separated from the first initial end surface by a length A+B mm is equal to or less than 0.9°.

DETAILED DESCRIPTION

There are many cases where optical fibers are twisted in the longitudinal direction. Therefore, the position of the core of the multi-core optical fiber is not fixed in the longitudinal direction of the optical fiber. In other words, the position of the core on the end surface before polishing and the position of the core on the end surface after polishing may deviate in the circumferential direction of the optical fiber. This does not lower the splicing loss when optical fibers are spliced to each other by connectors.

Illustrative aspects of the present disclosure provide a method of manufacturing an optical connector that can be spliced with low splicing loss when multi-core optical fibers are spliced to each other by connectors.

Description of Embodiments of Present Disclosure

The following is the list and description of the contents of embodiments of the present disclosure.

(1) According to one aspect of the present disclosure, there is provided a method of manufacturing an optical connector, including: preparing a multi-core optical fiber including a glass fiber and a resin coating that covers the glass fiber; inserting the glass fiber exposed from the resin coating into the ferrule at one end of the multi-core optical fiber such that the glass fiber protrudes from an end surface of a ferrule by a length A mm; rotating and aligning the multi-core optical fiber with respect to the ferrule; fixing the multi-core optical fiber to the ferrule; and polishing one end of the protruding glass fiber and the card surface of the ferrule so as to scrap off a tip end of the ferrule by a length B mm. A deviation angle in a circumferential direction between an end surface (first initial end surface) of the one end of the prepared glass fiber and a cross section of the glass fiber separated from the first initial end surface by a length A+B mm is equal to or less than 0.9°. In this case, the position of the core on the end surface of the glass fiber after polishing the ferrule and the position of the core on the end surface (first initial end surface) of the glass fiber before polishing the ferrule will have a smaller deviation angle of the optical fiber in the circumferential direction. Accordingly, when the multi-core optical fibers are spliced to each other by connectors, splicing is possible with low splicing loss.

(2) In the method of manufacturing an optical connector of the present disclosure according to the aspect, the preparation includes a first sub-step of measuring a deviation angle of the multi-core optical fiber in a circumferential direction along a longitudinal direction of the glass fiber from an end surface (second initial end surface) of the one end of the glass fiber, and a second sub-step of cleaving the multi-core optical fiber at a position separated from the second initial end surface of the glass fiber by the length A+B mm or greater when the deviation angle of the multi-core optical fiber in the circumferential direction between the second initial end surface of the glass fiber and the cross section separated by the length A+B mm exceeds 0.9°, and setting the second initial end surface as the first initial end surface of the one end of the prepared glass fiber when the deviation angle is equal to or less than 0.9°, and the first sub-step and the second sub-step are repeated until the deviation angle between the second initial end surface of the glass fiber and the cross section separated by the length A+B mm becomes equal to or less than 0.9°.

(3) in the method of manufacturing an optical connector of the present disclosure according to the aspect, the preparation includes preparing a first multi-core optical fiber having the deviation angle in the circumferential direction equal to or less than the 0.9° between one end surface and a cross section separated by the length A+B mm from the one end surface is, fusion-splicing a second multi-core optical fiber having the same core arrangement as the first multi-core optical fiber at the other end of the first multi-core optical fiber, and setting the one end surface of the first multi-core optical fiber as the first initial end surface of the one end of the prepared glass fiber. As the second multi-core optical fiber, an optical fiber of which a deviation angle θr of the optical fiber in the circumferential direction is not limited can be used. Therefore, optical fibers for optical connectors can be easily obtained.

(4) In the method of manufacturing an optical connector of the present disclosure according to the aspect, the deviation angle of the multi-core optical fiber in the circumferential direction is measured from a side surface of the glass fiber. (5) In the method of manufacturing an optical connector of the present disclosure according to the aspect, the deviation angle of the multi-core optical fiber in the circumferential direction is measured from an end surface of the glass fiber. In either case, the deviation angle θr of the optical fiber in the circumferential direction can be easily measured.

Details of Embodiments of Present Disclosure

With reference to the attached drawings, a suitable embodiment of the method of manufacturing an optical connector according to the present disclosure will be described. In the following, the optical connector will be described using the example of an LC connector.

Figure 1:
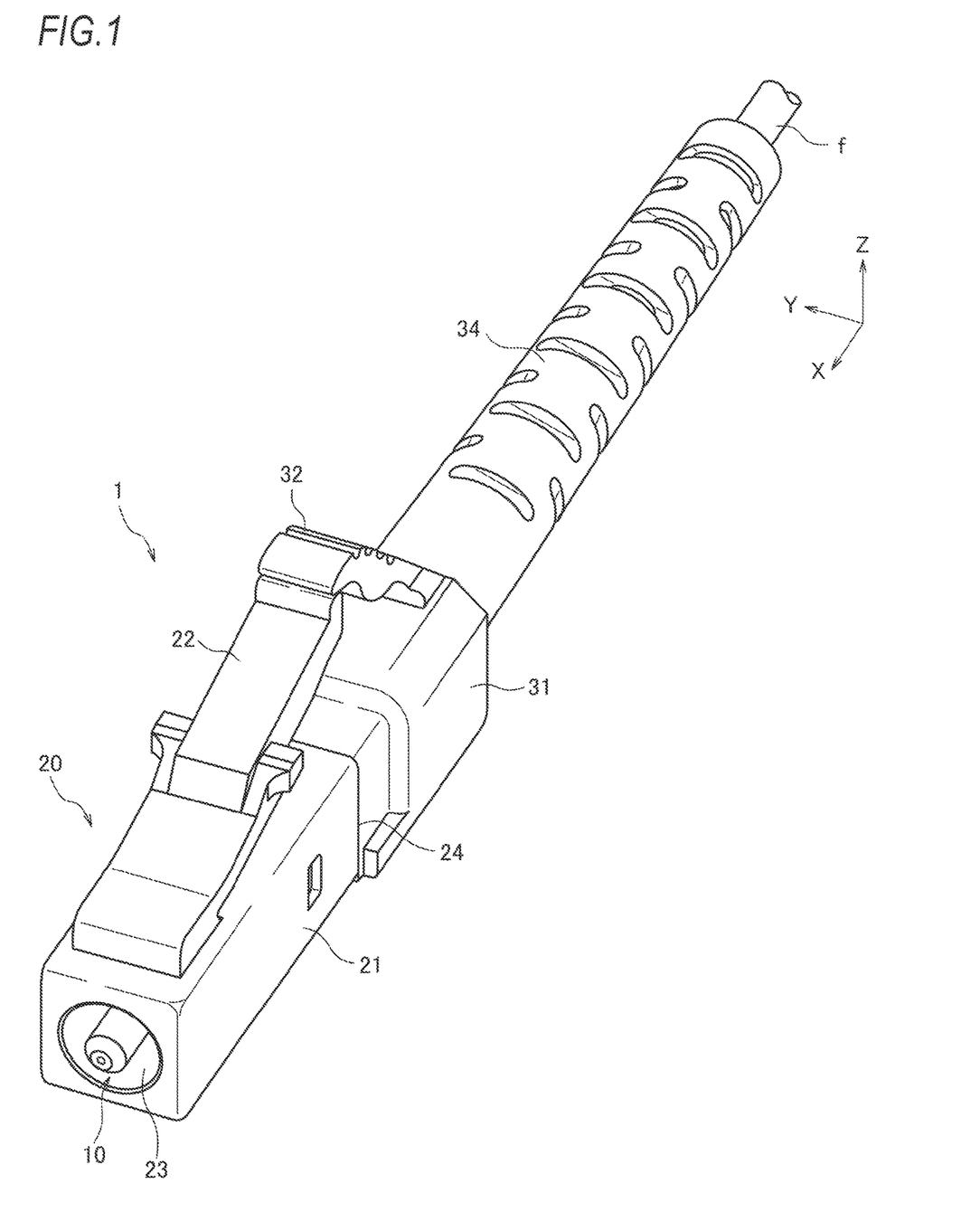
FIG. 1 is an external perspective view of an optical connector manufactured by a method of manufacturing an optical connector of the present disclosure.

FIG. 1 is an external perspective view of an optical connector 1 manufactured by the method of manufacturing an optical connector of the present disclosure. The optical connector 1 includes a plug frame 20 in which a ferrule 10 is accommodated, and a boot 34 that protects an optical fiber f is provided at the rear end of the plug frame 20. The plug frame 20 has a rectangular cylindrical front housing 21 extending in the X-axis direction illustrated in the drawing. The front housing 21 is made of resin, for example, and has a rear end opening 24 that can receive the ferrule 10 and a front end opening 23 that makes the ferrule 10 protrude. A flexible latch arm 22 is provided on the outer circumferential surface of the front housing 21.

The plug frame 20 has a rear housing 31 behind the front housing 21. The rear housing 31 is made of resin, for example, and can accommodate the rear end part of the ferrule 10 or the coil spring (not illustrated). The outer circumferential surface of the rear housing 31 has a clip 32 that can be engaged with the latch aim 22.

Figure 2:
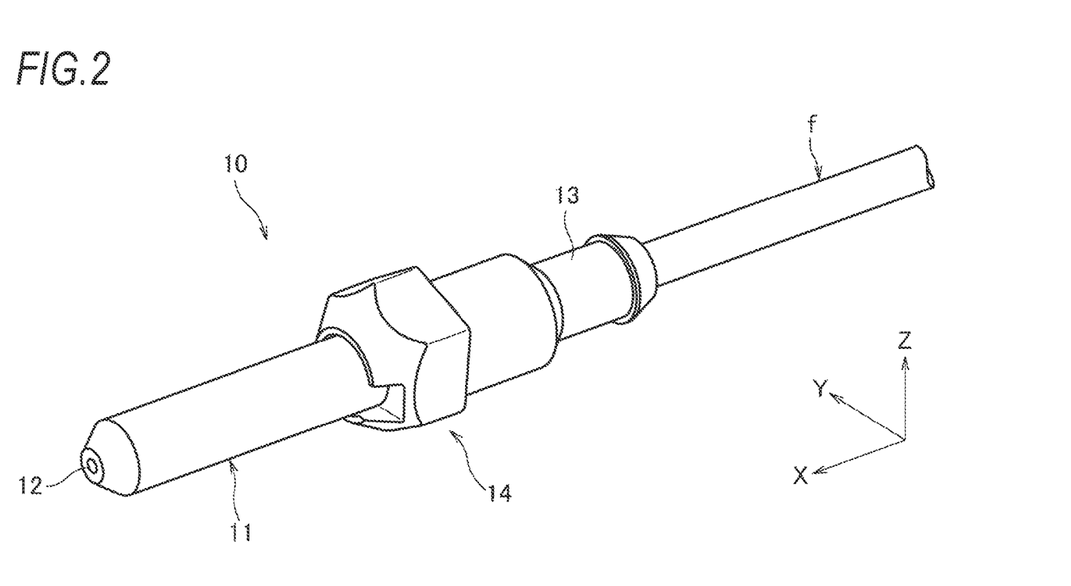
FIG. 2 is a perspective view of a ferrule included in the optical connector in FIG. 1.

FIG. 2 is a perspective view of the ferrule 10 included in the optical connector 1. The ferrule 10 has a ferrule main body 11 extending in the X-axis direction illustrated in the drawing. The ferrule main body 11 is made of zirconia, has a cylindrical shape, and has a rear end 13 where the optical fiber f is inserted and a front end 12 that exposes the tip end surface of the optical fiber f. A flange 14 is provided on the outside of the ferrule main body 11 substantially at the center position. The flange 14 has a substantially hexagonal shape or a substantially square shape in a sectional view.

Figure 3:
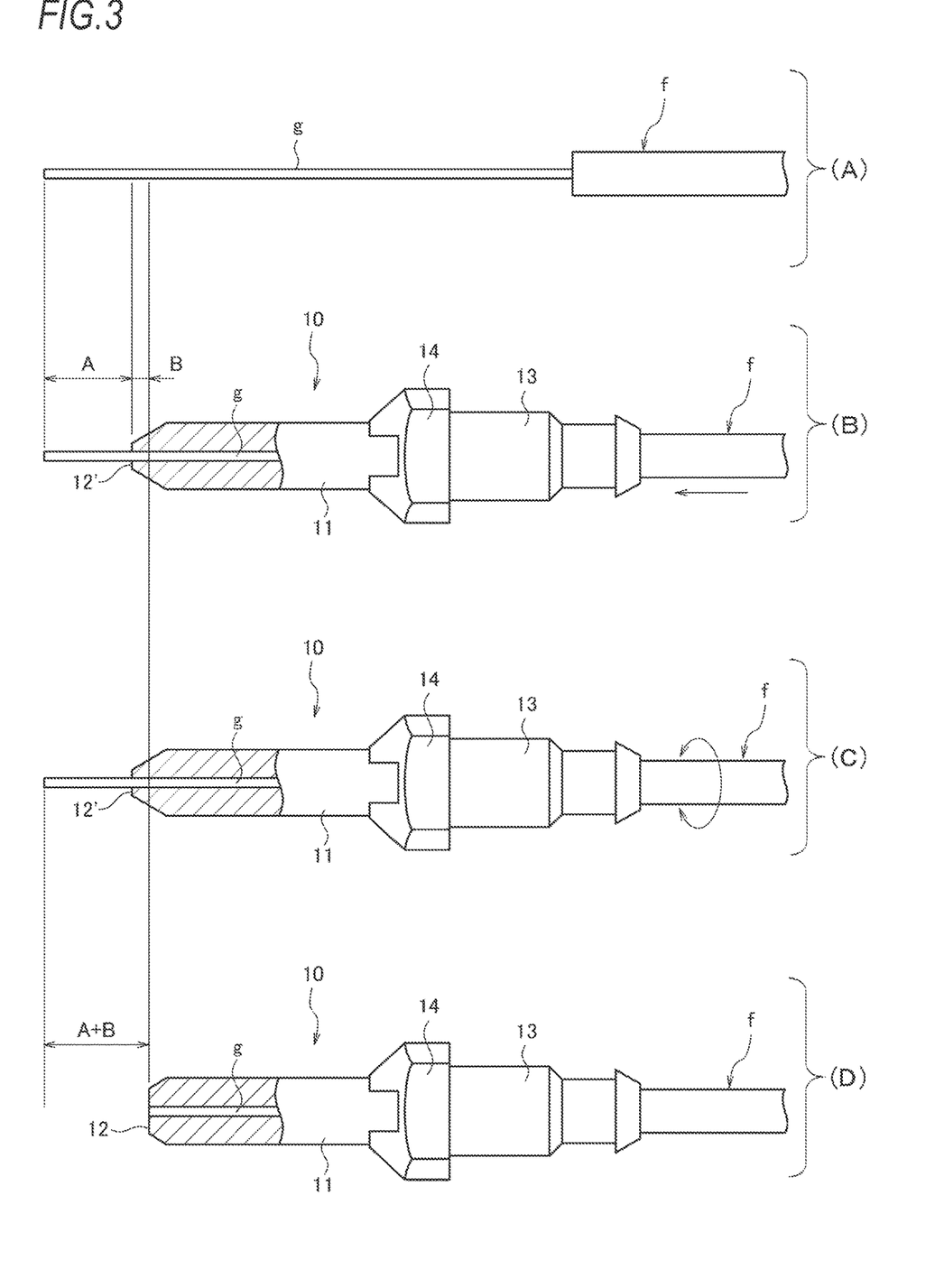
FIG. 3 is a view describing an example of the method of manufacturing the optical connector of the present disclosure.

FIG. 3 is a view describing an example of the method of manufacturing the optical connector. Regions of (A), (B), (C), and (D) in FIG. 3 are respectively the side views of the optical connector in each step of assembly. The optical fiber f is, for example, a multi-core optical fiber (MCF) having a plurality of cores in one common cladding. The multi-core optical fiber includes a glass fiber g and a resin coating that covers the glass fiber g. In the present disclosure, the optical fiber f that satisfies the conditions described below is prepared. As illustrated in the (A) region of FIG. 3, one end of the prepared optical fiber f has the resin coating removed to expose the glass fiber g. The first initial end surface is at one end of the prepared glass fiber g. Then, the optical fiber f is inserted into the ferrule 10 from the rear end 13, and the exposed glass fiber g protrudes from an end surface 12' of the ferrule main body 11 before polishing, as illustrated in the (B) region of FIG. 3. The end surface 12' before polishing corresponds to the end surface of the ferrule in the present disclosure. The length of the glass fiber g that has protruded from the end surface 12' before polishing is defined as a protrusion length A mm (for example, 5 mm).

Then, the optical fiber f is rotated against the ferrule 10 as illustrated by the arrow in the (C) region of FIG. 3 to align the core position at the first initial end surface to a predetermined position. The fiber tip end surface, which protrudes from the end surface 12' before polishing by the length A mm, corresponds to the end during rotational alignment. After this alignment, the exposed glass fiber g is bonded and fixed to the inside of the ferrule main body 11. Next, the glass fiber g, which protrudes from the end surface 12' before polishing, is polished together with the ferrule main body 11, The length (the length to be scraped oft) of the ferrule main body 11 to be polished is a polishing length B mm (for example, 0.5 mm). In other words, the polishing length of glass fiber g is A+B mm. Accordingly, the front end 12 with the glass fiber g at the center appears, as illustrated in the (D) region of FIG. 3. The front end 12 corresponds to the end of the connector and is polished to a convex spherical surface shape, for example.

After polishing, the rear end part of the ferrule 10 or the coil spring is accommodated in the rear housing 31 as described in FIG. 1, and the tip end part of the ferrule 10 is inserted into the front housing 21. When the clip 32 rides up on the latch arm 22, the front housing 21 is latched onto the rear housing 31. At the same time, the flange 14 is pushed forward by the biasing force of the coil spring. When the flange 14 moves forward and the flange 14 is inserted into the front housing 21, the ferrule 10 has the tip end part protruding from the front housing 21.

Figure 4A:
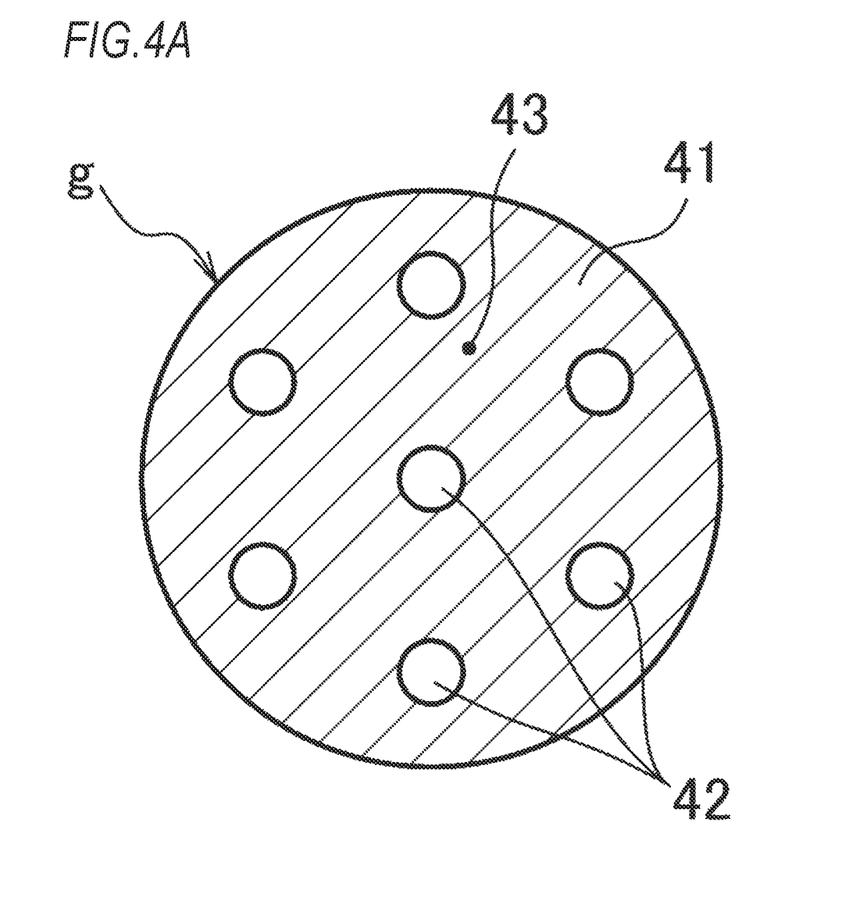
FIG. 4A is a view describing an example of a glass fiber that configures a multi-core optical fiber.
Figure 4B:
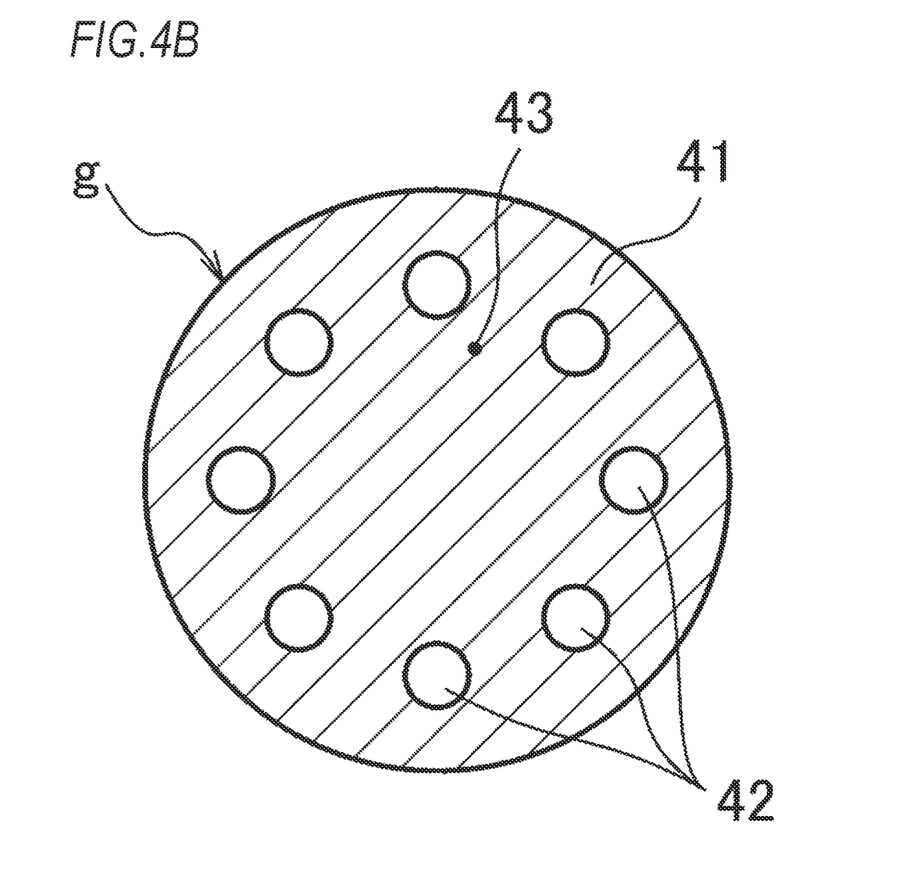
FIG. 4B is a view describing another example of the glass fiber that configures the multi-core optical fiber.

FIGS. 4A and 4B are views describing examples of the glass fiber g that configures the optical fiber f. The glass fiber g illustrated in FIG. 4A has seven cores 42 (including a center core and an outer circumferential core arranged in a hexagonal shape around the optical fiber center axis) within a cladding 41. The glass fiber g illustrated in FIG. 4B has eight cores 42 (only outer circumferential core arranged in an octagonal shape around the optical fiber center axis) within the cladding 41.

Figure 5A:
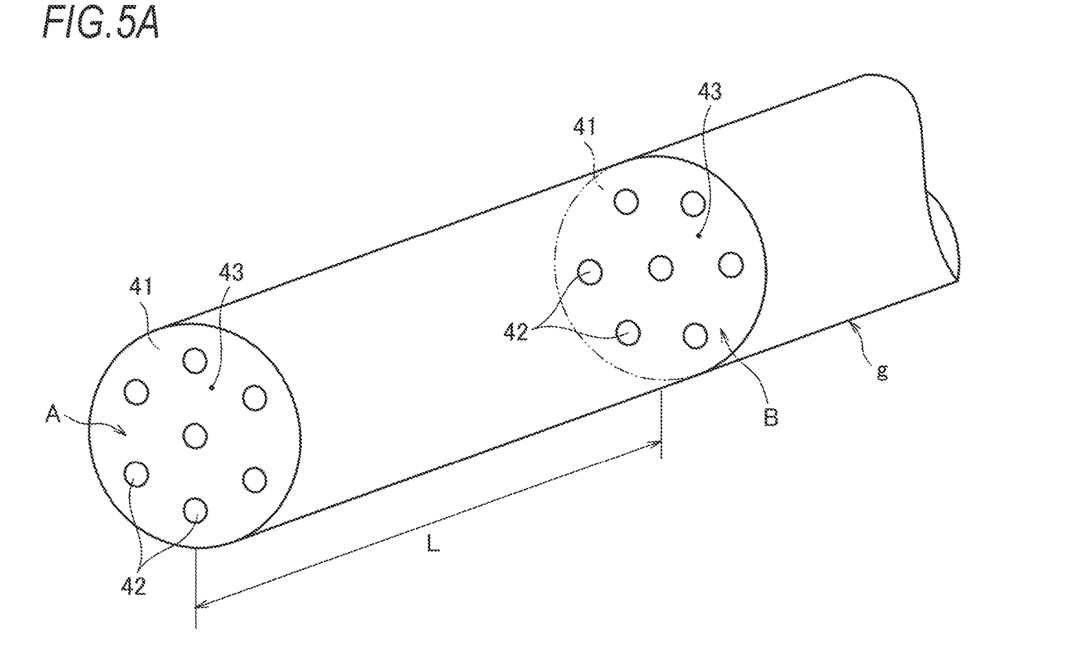
FIG. 5A is a perspective view of one end of the multi-core optical fiber.
Figure 5B:
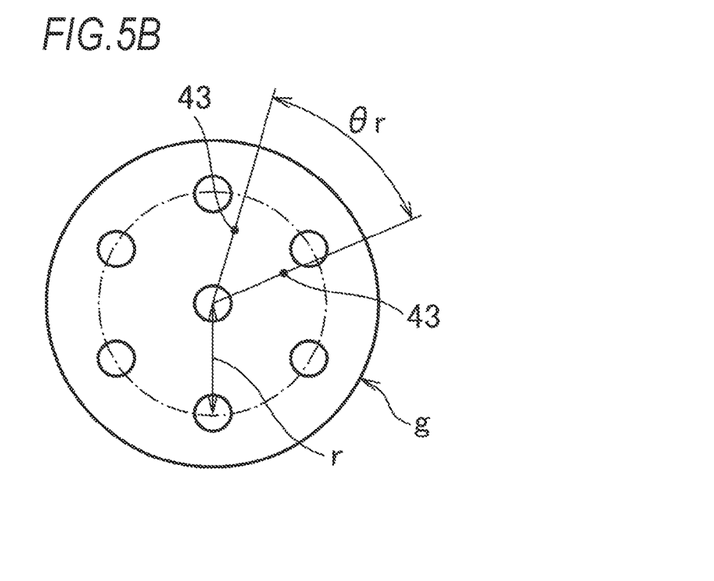
FIG. 5B is a front view of one end of the multi-core optical fiber.

FIGS. 5A and 5B are views describing the twisting of the optical fiber, FIG. 5A is a perspective view of one end of the optical fiber, and FIG. 5B is a front view of one end of the optical fiber. When the glass fiber g is not twisted within the range of L mm from the tip end, the position of the core at the end (fiber tip end surface protruding from the end surface 12' by the length A mm before polishing: illustrated in FIG. 5A as a first initial end surface A) during rotational alignment, and the position of the core of the end (front end 12:

illustrated in FIG. 5A as a section B) of the connector, are the same position within the respective cross section perpendicular to the longitudinal direction of the optical fiber f, and are not deviated in the circumferential direction of the optical fiber f. The cross section B is the end surface of the glass fiber g when the optical fiber f is cleaved at the position of L mm from the first initial end surface A. However, in reality, the optical fiber f is rotating within the cross section perpendicular to the longitudinal direction, and as illustrated in FIG. 5A, there is case where the position of the core on the first initial end surface A and the position of the core on the cross section B are deviated in the circumferential direction of the optical fiber f The deviation between the position of the core of the first initial end surface A and the position of the core of the cross section B is expressed as the deviation angle (hereinafter, referred to as a rotation angle deviation amount) θr° of the optical fiber f in the circumferential direction. The cladding 41 has a marker 43 in the vicinity of the outer circumferential core. For example, the end surface of the glass fiber g is observed while changing the focal distance of the observation lens, and the position of the marker 43 on the first initial end surface A and the position of the marker 43 on the cross section B are obtained. When the observation result on the first initial end surface A and the observation result on the cross section B are superposed, as illustrated in FIG. 5B, the rotation angle deviation amount θr is obtained by the angle formed by the straight line connecting the marker 43 of the first initial end surface A and the center of the glass fiber g and the straight line connecting the marker 43 of the cross section B and the center of the glass fiber g.

The rotation angle deviation amount θr between the first initial end surface A and the cross section B will affect the splicing loss when the splicing is performed by connectors.

Figure 6:
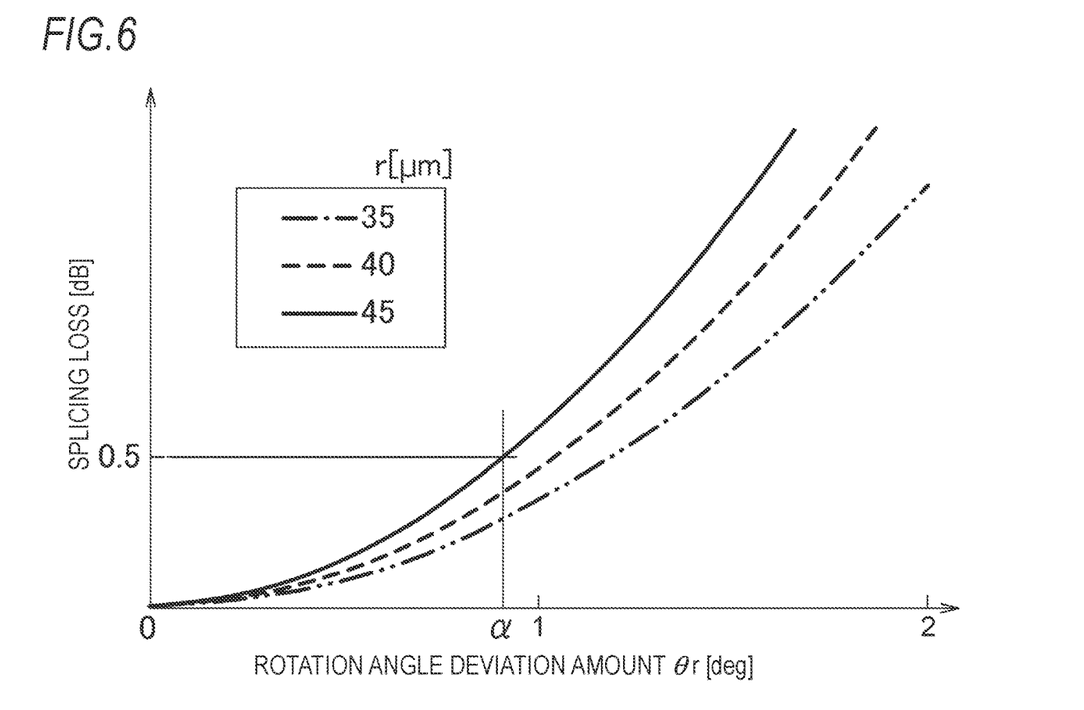
FIG. 6 is a view describing a relationship between splicing loss and angle deviation in the optical connector splicing the multi-core optical fibers.

FIG. 6 is a view describing the relationship between the splicing loss and the rotation angle deviation. The vertical axis is the splicing loss (maximum value) dB at the connector splicing, and the horizontal axis is the rotation angle deviation amount θr°. The distance from the center of the optical fiber f to the center of the outer core was defined as the core position r μm, and three types of optical fibers f with core positions r of 35, 40, and 45 μm were investigated as examples. The mode field diameter of the optical fiber f at a wavelength of 1310 rim is 8.6 μm.

The splicing loss is the highest when the core position r is 45 μm. Accordingly, when the core position r is 45 μm, it can be seen that the rotation angle deviation amount θr needs to equal to or less than α (for example 0.9°) to keep the splicing loss, for example, 0.5 dB or less, which is required for the product.

Therefore, in the preparation step of the optical fiber f, the optical fiber of which the rotation angle deviation amount θr due to the twisting of the optical fiber f is equal to or less than ±α° is prepared between the end surface of the glass fiber g and the cross section which is separated from the end surface of the glass fiber g by the length A+B mm.

The allowable rotation speed rot/mm per 1 mm of the optical fiber f can be obtained by (α°/360°)/(A+B) mm. In this manner, when the multi-core optical fiber of which the rotation angle deviation amount θr of the optical fiber f is equal to or less than ±α° is prepared between the end surface of the glass fiber g and the cross section separated by the length A+B mm, the position of the core on the end surface (end of the connector) of the glass fiber g after polishing the ferrule and the position of the core on the end surface (end at the time of rotational alignment) of the glass fiber g before polishing the ferrule will have a smaller deviation angle of the optical fiber in the circumferential direction. Accordingly, when the optical fibers are spliced to each other by connectors, splicing is possible with low splicing loss.

Figure 7:
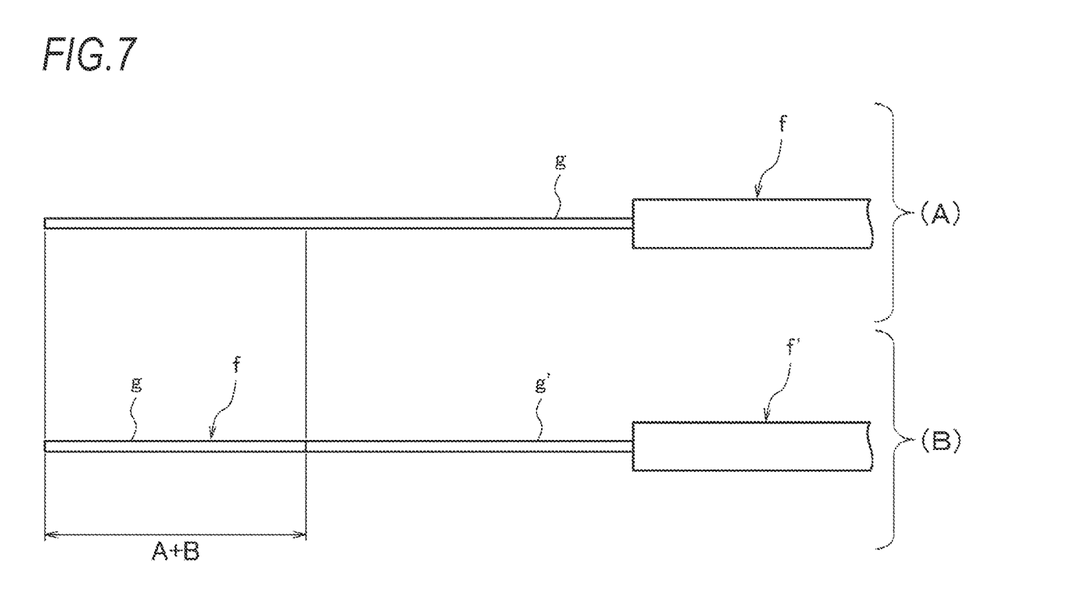
FIG. 7 is a view describing a prepared optical fiber.

FIG. 7 is a view describing the prepared optical fiber. In FIG. 7, the (A) region illustrates the optical fiber when the first method is used in the preparation step of the method of manufacturing the optical connector of the present disclosure, and the (B) region illustrates the optical fiber when the second method is used in the preparation step of the method of manufacturing the optical connector of the present disclosure. There are two following methods for preparing the optical fiber that satisfies the above-described conditions, The first method is to measure the rotation angle deviation amount θr of the optical fiber f along the longitudinal direction from the second initial end surface of the glass fiber g (the first sub-step), and to cleave the optical fiber f at the corresponding position or at the root side of the position, and discard the optical fiber on the end surface side when the rotation angle deviation amount θr between the second initial end surface of the glass fiber g and the cross section separated by A+B mm exceeds ±α (one example of the second sub-step).

Meanwhile, when the rotation angle deviation amount θr of the optical fiber f between the end surface of the glass fiber g and the cross section separated by the length A+B mm is equal to or less than ±α°, as illustrated in the (A) region of FIG. 7, the second initial end surface is used as the first initial end surface of the prepared glass fiber g, the optical connector is manufactured by using the optical fiber f (another example of the second sub-step).

The first and second sub-steps are repeated until the rotation angle deviation amount θr becomes equal to or less than ±α°.

The second method is to separately prepare the optical fiber f (corresponding to the first multi-core optical fiber) of which the rotation angle deviation amount θr between one end surface of the glass fiber g and the cross section separated by the length of A+B mm is equal to or less than ±α°, and to fuse-splice the other end of the optical fiber f to the end surface of a glass fiber g' of another multi-core optical fiber f' (corresponding to the second multi-core optical fiber) having the same core arrangement as the optical fiber f. As another optical fiber f', an optical fiber of which the rotation angle deviation amount θr is not limited can be used. One end surface of the optical fiber f is set as the first initial end surface of one end of the prepared glass fiber g. Accordingly, as illustrated in the (B) region of FIG. 7, an optical fiber having the length from the end surface of the measured glass fiber g to the position required for manufacturing the optical connector is fabricated and adopted.

Incidentally, in the above-described embodiment, the optical connector will be described using the example of the LC connector. However, the present disclosure is not limited to the example. For example, the present disclosure can also be applied to other forms of optical connectors, including SC connectors and MU connectors. In order to obtain the rotation angle deviation amount θr, an example of observing the end surface of the glass fiber g was described, but the side surface of the glass fiber g can also be Observed. Specifically, the core of the glass fiber g is irradiated with light, and the changes in the position and state of the core of the glass fiber g in the longitudinal direction are confirmed from the transmitted or reflected light on the side surface of the glass fiber g. When a deviation amount E of the glass fiber g in the circumferential direction is known by observing the side surface of the glass fiber g, the core position r is known, and thus, when the rotation angle deviation amount θr is small, θr can be approximated by E/r.

It should be considered that the embodiments disclosed here are exemplary in all respects and not restrictive. The scope of the present disclosure is indicated by the scope of claims, not the above-described meaning, and is intended to include all modifications within the meaning and scope equivalent to the scope of claims.

What is claimed is:

1. A method of manufacturing an optical connector, comprising:
   preparing a multi-core optical fiber including a glass fiber and a resin coating that covers the glass fiber;
   inserting into the ferrule the glass fiber exposed from the resin coating at one end of the multi-core optical fiber such that the glass fiber protrudes from an end surface of a ferrule by a length A mm;
   rotating and aligning the multi-core optical fiber with respect to the ferrule;
   fixing the multi-core optical fiber to the ferrule; and
   polishing one end of the protruded glass fiber and the end surface of the ferrule so as to scrap off a tip end of the ferrule by a length B mm,
   wherein a deviation angle in a circumferential direction between a first initial end surface of the one end of the prepared glass fiber and a cross section of the glass fiber separated from the first initial end surface by a length A+B mm is equal to or less than 0.9°,
   wherein the preparation includes:
      a first sub-step of measuring a deviation angle of the multi-core optical fiber in the circumferential direction along a longitudinal direction of the glass fiber from a second initial end surface of the one end of the glass fiber; and
      a second sub-step of cleaving the multi-core optical fiber at a position separated from the second initial end surface of the glass fiber by the length A+B mm or greater when the deviation angle of the multi-core optical fiber in the circumferential direction between the second initial end surface of the glass fiber and the cross section separated by the length A+B mm exceeds 0.9°, and setting the second initial end surface as the first initial end surface of the one end of the prepared glass fiber when the deviation angle is equal to or less than 0.9°, and
   wherein the first sub-step and the second sub-step are repeated until the deviation angle between the second initial end surface of the glass fiber and the cross section separated by the length A+B mm becomes equal to or less than 0.9°.

2. The method of manufacturing an optical connector according to claim 1,
   wherein the deviation angle of the multi-core optical fiber in the circumferential direction is measured from a side surface of the glass fiber.

3. The method of manufacturing an optical connector according to claim 1,
   wherein the deviation angle of the multi-core optical fiber in the circumferential direction is measured from an end surface of the glass fiber.

4. A method of manufacturing an optical connector, comprising:
   preparing a multi-core optical fiber including a glass fiber and a resin coating that covers the glass fiber;
   inserting into the ferrule the glass fiber exposed from the resin coating at one end of the multi-core optical fiber such that the glass fiber protrudes from an end surface of a ferrule by a length A mm;
   rotating and aligning the multi-core optical fiber with respect to the ferrule;
   fixing the multi-core optical fiber to the ferrule; and
   polishing one end of the protruded glass fiber and the end surface of the ferrule so as to scrap off a tip end of the ferrule by a length B mm,
   wherein a deviation angle in a circumferential direction between a first initial end surface of the one end of the prepared glass fiber and a cross section of the glass fiber separated from the first initial end surface by a length A+B mm is equal to or less than 0.9°, and
   wherein the preparation includes:
      preparing a first multi-core optical fiber having the deviation angle in the circumferential direction equal to or less than 0.9° between one end surface and a cross section separated by the length A+B mm from the one end surface; and
      fusion-splicing a second multi-core optical fiber having the same core arrangement as the first multi-core optical fiber at the other end of the first multi-core optical fiber; and
      setting the one end surface of the first multi-core optical fiber as the first initial end surface of the one end of the prepared glass fiber.

5. The method of manufacturing an optical connector according to claim 4,
   wherein the deviation angle of the multi-core optical fiber in the circumferential direction is measured from a side surface of the glass fiber.

6. The method of manufacturing an optical connector according to claim 4,
   wherein the deviation angle of the multi-core optical fiber in the circumferential direction is measured from an end surface of the glass fiber.

* * * * *